Figure 3:
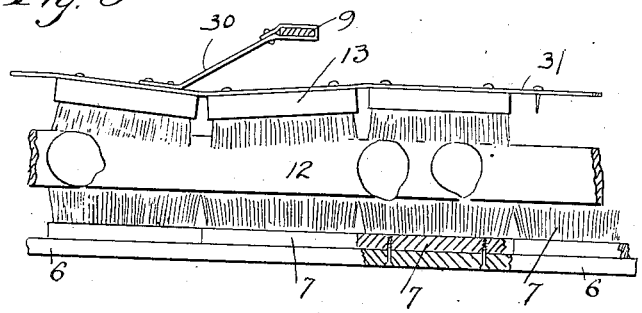

No. 848,350. PATENTED MAR. 26, 1907.
F. A. COREY.
FRUIT CLEANING APPARATUS.
APPLICATION FILED JUNE 1, 1905.
2 SHEETS—SHEET 1.
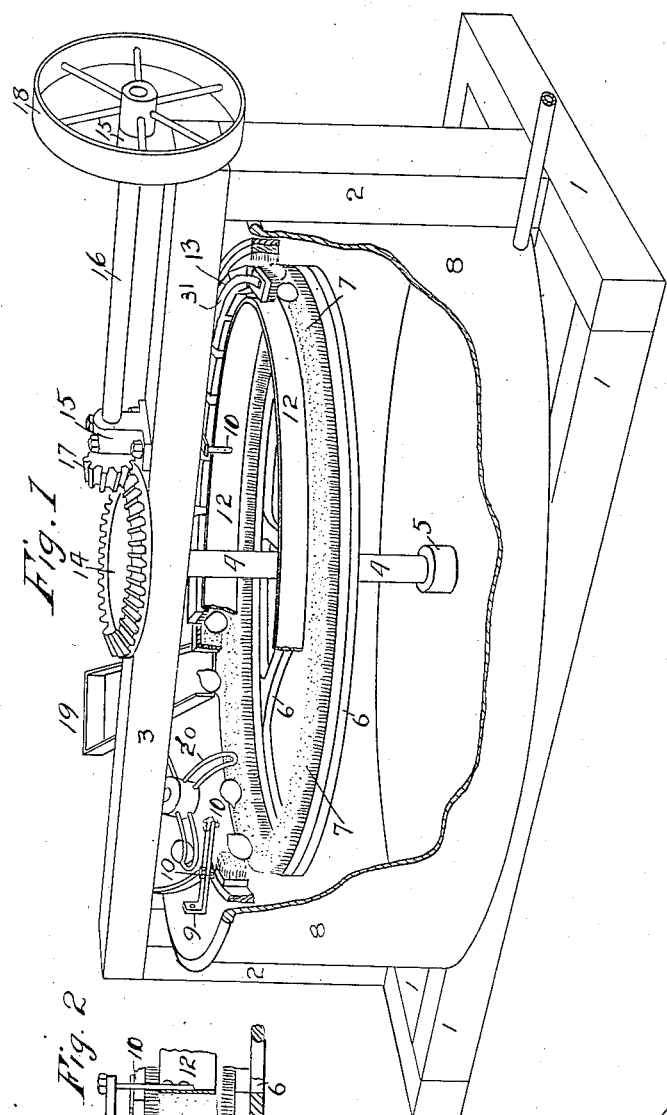
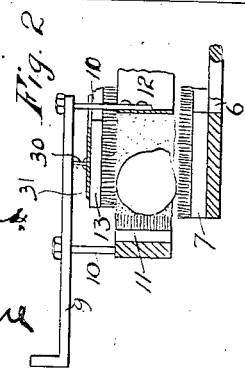
Witnesses
F. B. Fass
C. C. Teague
Inventor
Franklin A. Corey No. 848,350. PATENTED MAR. 26, 1907.
F. A. COREY.
FRUIT CLEANING APPARATUS.
APPLICATION FILED JUNE 1, 1905.

2 SHEETS—SHEET 2.

Witnesses
Harry A. Brooks
S. Ford

Inventor
Franklin A. Corey
By
Mignon Ford
Attorney

UNITED STATES PATENT OFFICE.

FRANKLEN A. COREY, OF SANTA PAULA, CALIFORNIA.

FRUIT-CLEANING APPARATUS.

No. 848,350.   Specification of Letters Patent.   Patented March 26, 1907.

Application filed June 1, 1905. Serial No. 263,335.

*To all whom it may concern:*

Be it known that I, FRANKLEN A. COREY, a citizen of the United States, residing at Santa Paula, in the county of Ventura, State of California, have invented certain new and useful Improvements in Fruit-Cleaning Apparatus; and I do hereby declare the following to be a full, clear, and exact description of the invention, such as will enable others skilled in the art to which it appertains to make and use the same.

This invention relates to fruit-cleaning apparatus, and has for its object to provide an apparatus for removing scale and other blemishes from the surface of fruit.

It is also an object of this invention to provide a machine which shall be simple and cheap in construction and efficient for the purpose intended.

The invention consists, essentially, of a horizontal rotatable substantially continuous brush member, an upright stationary annular inward-facing substantially continuous brush member, a concentric brushless guard-ring within said annular brush member, and a horizontal yielding substantially continuous brush member overlying and opposed to the rotatable brush member, these several parts inclosing an annular runway for the fruit to be cleaned.

It has been proposed heretofore to carry fruit in a circular path between an inner upright continuous rotating brush member and an outer opposed stationary continuous brush member, the fruit being gripped between the two brush-surfaces and rolled around by virtue of this lateral pressure; but this arrangement is in some ways unsatisfactory, since the pressure exerted upon the fruit between the inner and outer annular brushes sometimes bruises the more tender fruit. The conception underlying my invention is to carry the fruit around in engagement with a continuous inward-facing annular brush member by centrifugal action instead of by being gripped between such a brush member and an inner concentric member, and to this end I substitute for the inner annular brush a plane annular guard and impart the circular motion to the fruit by causing it to rest on a continuous horizontal rotating brush. Thus the traction exerted upon the fruit by the continuous underlying rotating brush exerts a centrifugal action upon the fruit and keeps it in contact with the continuous inward-facing annular brush throughout its circular movement. To scrub fruit along such an annular brush member solely by centrifugal action, I believe, constitutes a radical departure in fruit-cleaning apparatus. The value of the centrifugal action in this connection is that it forces the fruit against the brush with a yielding force and obviates all danger of bruising. It will be obvious that were the upright annular brush not continuous, but merely in the nature of isolated widely-spaced tufts, the very advantage just recited would be entirely lost, since delicate fruit in bounding from a tuft of bristles against the unprotected portion of the supporting-wall therefor would be liable to receive considerable damage. Moreover, if the lower rotating brush were interrupted there would be no proper continuous traction upon the fruit, and the result would be a mere battering of the fruit between the isolated rotating-brush tufts and the stationary tufts, with frequent impact against the unprotected portions of the supports of both series of tufts. My idea is to make all three brushes substantially continuous, so as to inclose between them a continuous annular passage along which the fruit will be carried in a uniform manner.

In order to assist the annular brush in cleaning the fruit, I provide a continuous overlying horizontal stationary brush member, as already mentioned. It is to be understood, however, that the purpose of this overlying brush is not to effect a gripping of the fruit between it and the lower rotating brush. This is not necessary, since the proper rolling of the fruit is effected by the centrifugal action forcing the fruit in its travel against the outer annular brush. Therefore this upper brush may be sufficiently spaced from the lower brush to avoid all gripping and at the same time to bear upon the fruit just sufficiently to aid in removing scale, &c. In order to insure that there will be no bruising of the fruit between the upper and lower brushes, the upper brush is made yielding.

Figure 4:
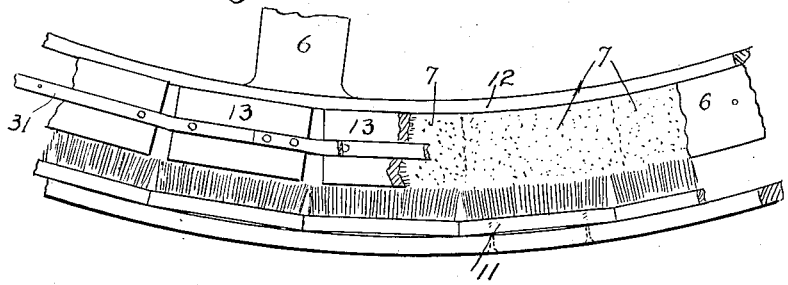

Figure 1 is a perspective view, partly broken away, of my apparatus. Fig. 2 is a detail view showing the manner in which the brushes operate upon the fruit. Fig. 3 is a side elevational view of a portion of the spider and the brushes mounted thereon and the flexibly-connected brushes, and Fig. 4 is a top plan view of the construction shown in Fig. 3 with the addition of the stationary annular brush.

Numeral 1 designates a frame having uprights 2, upon which is mounted a cross-bar 3 in a bearing in which is journaled a vertical shaft 4, the lower end of which is supported in a step-bearing 5. Rigidly affixed to shaft 4 is a wheel or spider 6, on the upper side of the periphery of which may be mounted a brush 7, which is preferably in sections. The frame 1 also supports a tank 8, adapted to be filled with water to a predetermined depth. Around the edge of the tank 8 are placed supporting-brackets 9, having studs 10 depending therefrom, the outer ones of which support a frame carrying an annular brush 11, which may be likewise formed in sections.

The inner studs 10 support a guide-ring 12. Attached to brackets 9 by arms 30 or other suitable fastening are a series of horizontal brushes 13 immediately above the brushes 7 and flexibly connected together in the form of a ring by means of the overlying flexible annular strip 31.

It will be seen that the brushes 7, 11, and 13 and the annular guard 12 inclose an annular fruit-passage, and reference to the drawings will show that this passage is preferably of greater width than depth. In this way there is absolutely no gripping between inner and outer annular surfaces, but the fruit is rolled along the outer edge of the annular passage by means of the centrifugal force set up by the rotating brush 7.

It is to be noted that the method of mounting the brushes 13 on the brackets 9, which are supported only at their outer ends, and suspending them from these brackets by the arms 30 insures great flexibility.

Rigidly mounted upon the upper end of shaft 4 is a bevel-gear 14. Cross-piece 3 of the frame has bearings 15, in which a shaft 16 is journaled, carrying on one end bevel-pinion 17, meshing with bevel-gear 14, and a pulley 18, rigidly affixed to its outer end, whereby a rotary motion may be imparted to the shaft 4, spider 6, and brushes 7.

A trough or hopper 19 may be arranged to deliver the fruit on the brushes 7, and a dipper 20 may be mounted to remove them therefrom, the means for operating said dipper not being shown, as it forms no part of this invention It is understood that a portion of the brushes 11 and 13 may be omitted to allow for the passing of the fruit onto and off of brushes 7. The brushes are, however, substantially continuous—that is, they are not mere isolated tufts or bristles set at considerable intervals from each other, such an arrangement being quite useless for my purpose.

The mode of operation of this invention is as follows: Spider 6 and brushes 7 being in rotation and the tank being filled with water, the fruit is placed in the hopper 19 and passes by gravitation down onto brushes 7 and is carried thereby under brushes 13 and is forced against brushes 11 by centrifugal force. After the fruit has completed its passage over the brush 7 it comes to the dipper 20, which removes it from the brush 7 and delivers it to any suitable means for conveying it to the place desired.

It is not desired to limit or confine this invention to the specific construction, combination, and arrangement of parts herein shown and described, and the right is reserved to make all such changes in and modifications of the same as come within the spirit and scope of this invention.

Having thus described my invention and explained the operation thereof, what I claim, and desire to secure by Letters Patent, is the following:

1. In a fruit-cleaning apparatus, the combination of a rotatable horizontal substantially continuous brush upon which the fruit is designed to rest, an upright annular stationary substantially continuous brush along which the fruit is designed to be carried by the centrifugal action set up by said rotatable brush, a simple upright concentric guard within said annular brush, and a substantially continuous stationary yielding horizontal brush overlying and opposed to said rotatable brush, said brushes and guard together inclosing a continuous annular fruit-passage.

2. In a fruit-cleaning apparatus, the combination of a rotatable horizontal substantially continuous brush upon which the fruit is designed to rest, an upright annular stationary substantially continuous brush along which the fruit is designed to be carried by the centrifugal action set up by said rotatable brush, an upright concentric guard within said annular brush, and a substantially continuous stationary yielding horizontal brush overlying and opposed to said rotatable brush, said brushes and guard being so positioned as to inclose between them a continuous annular fruit-passage of greater width than depth.

In testimony whereof I have signed my name to this specification, in the presence of two subscribing witnesses, at Santa Paula, California, this 11th day of May, 1905.

FRANKLEN A. COREY.

Witnesses:
F. B. Foss,
C. C. Teague.